Figure 3:

No. 861,582. PATENTED JULY 30, 1907.
R. D. FILDES.
GAGE.
APPLICATION FILED JULY 24, 1906.
2 SHEETS—SHEET 1.
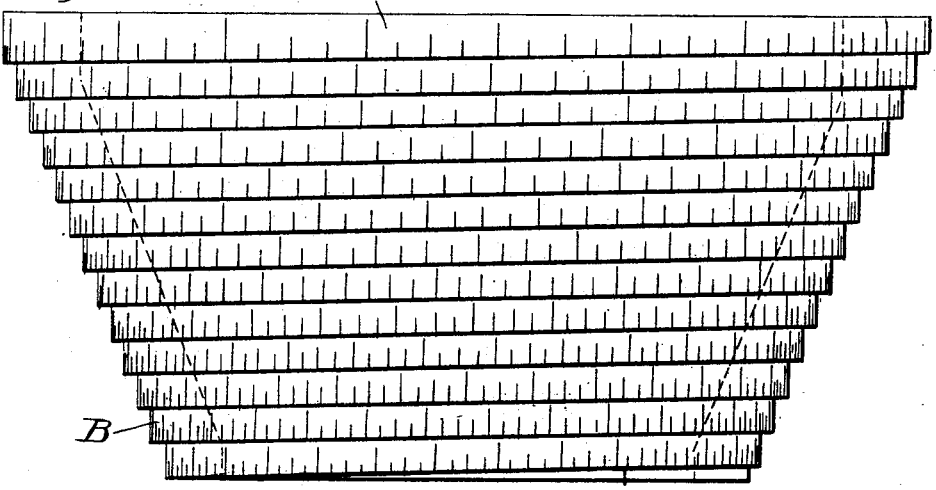
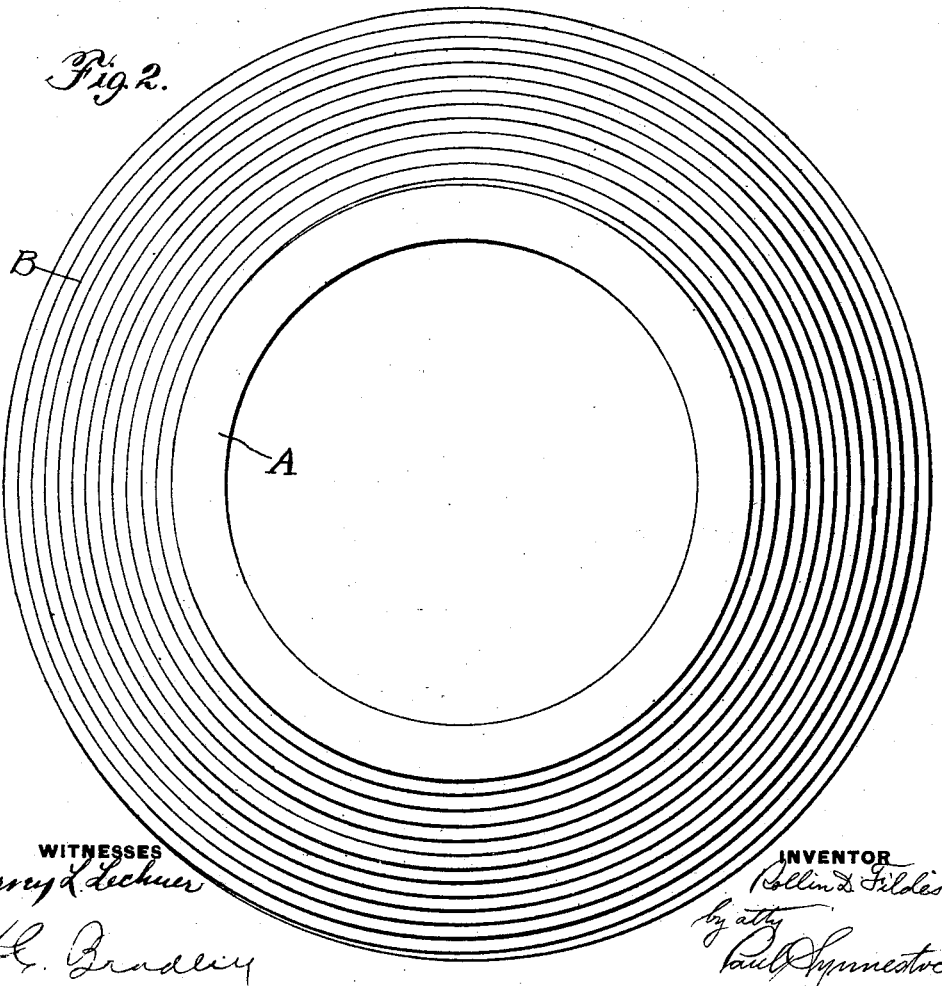

No. 861,582.

PATENTED JULY 30, 1907.

R. D. FILDES.
GAGE.
APPLICATION FILED JULY 24, 1906.

2 SHEETS—SHEET 2.

WITNESSES
Harvey L. Lehner
J. C. Bradley

INVENTOR
Rollin D. Fildes
by atty
Paul Synnestvedt

UNITED STATES PATENT OFFICE.

ROLLIN D. FILDES, OF CLEVELAND, OHIO, ASSIGNOR OF ONE-HALF TO LE GRAND PARISH, OF CLEVELAND, OHIO.

GAGE.

No. 861,582.     Specification of Letters Patent.     Patented July 30, 1907.

Application filed July 24, 1906. Serial No. 327,520.

*To all whom it may concern:*

Be it known that I, ROLLIN D. FILDES, a citizen of the United States, residing at Cleveland, in the county of Cuyahoga and State of Ohio, have invented certain new and useful Improvements in Gages, of which the following is a specification.

My invention relates to measuring gages, and has for its objects; to provide an inexpensive gage adapted to do the work of the fine measurement gages now in use, such as the well known micrometer and vernier gages, which gages are very expensive especially in the larger sizes; to provide a gage of this character in which no movable parts are necessitated, requiring tedious and careful setting; to provide a gage from which measurements may be taken with great rapidity and accuracy; and finally to provide a spiral gage in which measurements may be taken in a plane at right angles to the axis of the spiral. These and other objects are accomplished by my invention, certain embodiments of which are shown in the accompanying drawings in which Figure 1 is a side elevation of one form of gage, Figure 2 is the bottom view of the gage of Figure 1, Figure 3 is a side elevation of a different and preferred form of gag, and Figure 4 is a plan view of the bottom of the gage of Figure 3.

As shown in Figures 1 and 2, my gage consists of a body portion A provided with a spiral B. The conical spiral is preferable a true geometric one, cut with great accuracy, and for each circumference is enlarged a certain fixed amount. The diameter of the spiral is, of course, changing at every point, so that the number of graduations possible, depends only on the length of the spiral, and the distance across the gage at any desired point of the spiral is ordinarily taken by means of a pair of calipers, placed diametrically o the body of the gage. The graduations are placed preferably at the lower edge of the spiral band and the calipers are placed at such point on one side and at the bottom of the band on the opposite side of the gage, at 180° therefrom. To decrease the weight and to provide for convenient handling, the body of the gage is preferably cored out, as indicated in the drawing. It will be noticed that in taking measurements on the gage shown in Figures 1 and 2, that the plane in which the measurement is taken or in which the end of the calipers lie, is not exactly at right angles to the plane of the axis of the gage, and in order to secure the measuring plane at exact right angles, and also secure other advantages, I have designed the construction shown in Figures 3 and 4 which is my preferred form. Figures are preferably used at certain of the graduations to indicate the transverse distances at these points.

Figure 4:
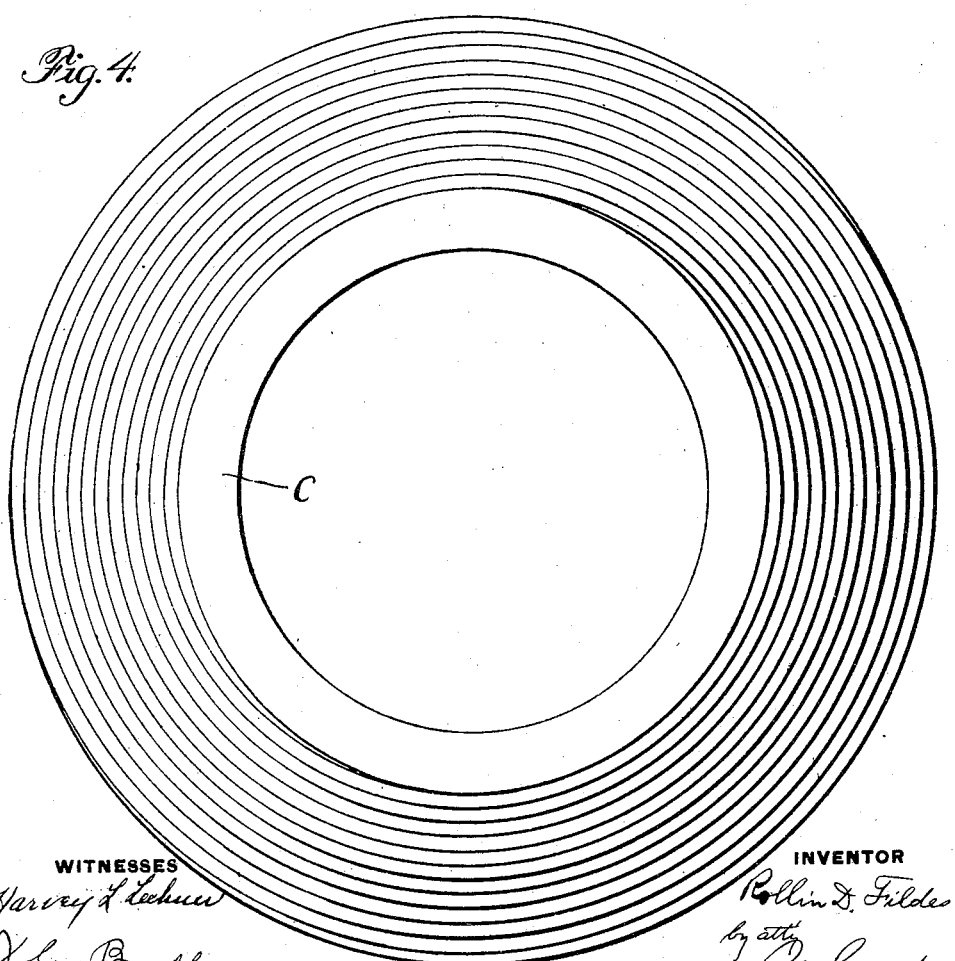

As shown in Figures 3 and 4, the body C of the gage is provided with two conical spirals instead of the single one, as shown in Figures 1 and 2, and as indicated, only one of these spirals D is graduated, the other spiral E being perfectly plain. As in the other form of device figures are preferably used at cetrain of the graduations to indicate the transverse distances at these points. As clearly indicated in Figure 3, these two spirals commence at 180° from each other. The pitch of each of the spirals bands is equal to twice the width of such bands, so that the bands alternate as indicated. Measurements are taken from a point on the lower edge of the graduated spiral on one side of the device to the lower edge of the plain spiral at 180° from such first point, and it will be apparent that the plane of such measurements is exactly at right angles to the plane of the axis of the body of the gage. This construction not only provides for the measurements at right angles to the plane of the axis of the spiral, but also gives a smooth surface over which to run the calipers on the side opposite to the graduations, and furthermore renders it easier to distinguish the proper curve of the spiral on which to place one side of the calipers after the other side has been placed upon its proper graduation.

The advantages attained by my invention will be obvious, as it is clear that a gage of this character can be constructed very cheaply by means of a milling or similar machine, and that the gage when accurately cut, will serve to give measurements of infinite fineness, thus taking the place of the expensive micrometers now in use. It will also be apparent that measurements may also be taken much more rapidly upon this gage, than upon a micrometer as there are no parts which need to be carefully set, and all that is necessary is the selection of the proper graduation and the turning of the calipers to the side opposite such graduation. It will also be seen that there are no moving friction parts as in the ordinary micrometer, which are liable to wear and render the gage inaccurate in the course of time.

It will be understood that many modifications of my invention as shown, might be made without departing from the spirit thereof. Instead of providing the double spiral as shown in Figures 3 and 4, to accomplish the desired purpose, the number of spirals might be further multiplied with similar results. Several sets of spirals with different graduations might be placed upon the same body, such arrangements being mere matters of duplication, and the spiral is of course, as applicable to an internal gage as to an external one. It will also be apparent that the form of the true geometric spiral might be somewhat departed from without entirely destroying the utility of the device if the graduations upon the spiral were properly arranged. It will also be seen that the body of the gage need not be free, as shown in the figures of the drawing, but if desired, such gages might be mounted revolubly on axes and perhaps provided with pointers to indicate points at exactly 180° from each other. All these and other modifications which will readily occur to those skilled in the art, are comprehended by my invention and intended to be covered by the claims.

Having thus described my invention and illustrated its use, what I claim as new and desire to secure by Letters Patent, is the following:

1. A gage comprising a body provided with a conical spiral graduated to indicate the transverse distances across the gage at the points of graduation.

2. A gage comprising a body provided with a pair of alternating conical spirals of the same pitch and width, one of which is plain and the other of which is graduated to indicate the transverse distances from the points of graduation to the edge of the opposite plain spiral.

In testimony whereof I have hereunto signed my name in the presence of the two subscribed witnesses.

ROLLIN D. FILDES.

Witnesses:
H. B. SLAYBAUGH,
D. G. JAEGER.